No. 757,318. PATENTED APR. 12, 1904.
F. KRAUSE.
APPARATUS FOR SETTING DIAMONDS FOR INDUSTRIAL PURPOSES.
APPLICATION FILED OCT. 23, 1903.
NO MODEL.
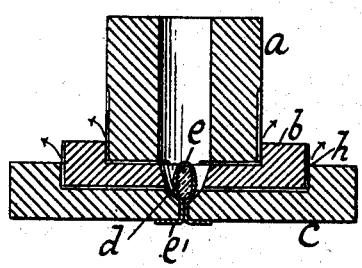
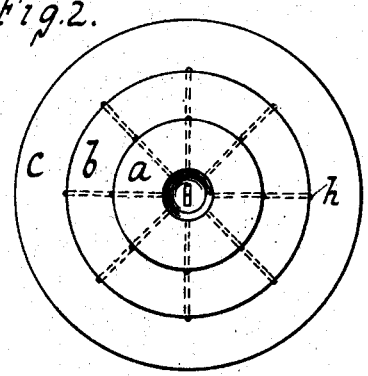
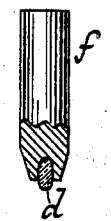
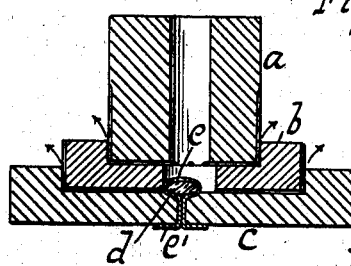
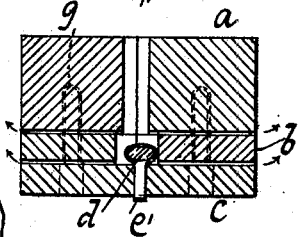
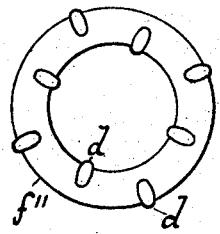
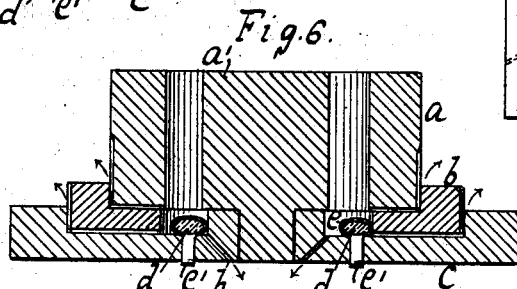
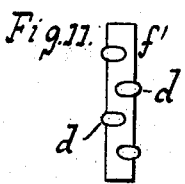
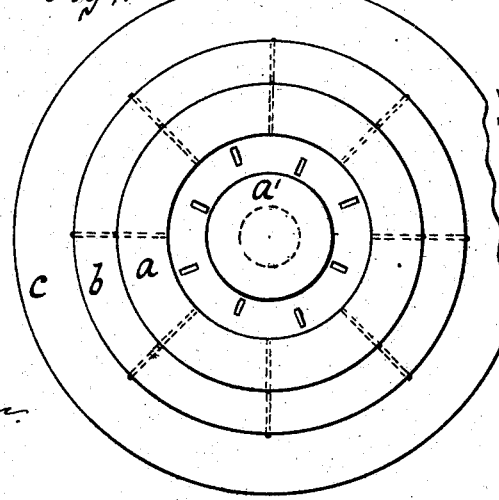
WITNESSES:
William Miller
INVENTOR
Friedrich Krause
BY
W. C. Hauff
ATTORNEY No. 757,318.

Patented April 12, 1904.

UNITED STATES PATENT OFFICE.

FRIEDRICH KRAUSE, OF HOBOKEN, NEW JERSEY.

APPARATUS FOR SETTING DIAMONDS FOR INDUSTRIAL PURPOSES.

SPECIFICATION forming part of Letters Patent No. 757,318, dated April 12, 1904.

Application filed October 23, 1903. Serial No. 178,263. (No model.)

*To all whom it may concern:*

Be it known that I, FRIEDRICH KRAUSE, a subject of the Emperor of Germany, residing at Hoboken, in the county of Hudson and State of New Jersey, have invented new and useful Improvements in Setting Diamonds for Industrial Purposes, of which the following is a specification.

This invention relates to what are known as "diamond-tools."

The word "diamond" is not employed as expressing any limitation to the scope of the invention or the claims, but for some industrial purposes diamond is the material employed, possessing certain requisite qualities of hardness, grinding, or cutting the expression "diamond" is appropriate.

By means of this invention a diamond or the like can be set or cast in steel or other suitable alloy or material.

This invention is set forth in the following specification and claims and illustrated in the annexed drawings, in which—

Figure 1 is a sectional view of a mold used in the manufacture of a tool. Fig. 2 is a plan view of Fig. 1. Fig. 3 shows a tool from the mold of Fig. 1. Fig. 4 shows a modification. Fig. 5 shows a tool from the mold of Fig. 4. Fig. 6 shows a mold for an annular tool or drill. Fig. 7 is a plan view of Fig. 6. Fig. 8 shows a tool from the mold of Fig. 6. Fig. 9 shows a mold for casting a saw or cutting-plate or tool. Fig. 10 is a cross-section of Fig. 9. Fig. 11 shows a tool from the mold of Fig. 10.

In the drawings is shown a base $c$, with a slit or opening. A diamond, stone, or the like is shown at $d$ inclosed in a wrapping or mantle $e$ of thin metal. By "thin" is meant that the metal or wrapping is sufficiently slight or flexible to be pressed or wrapped tight or close fitting about the diamond to form a casing therefor. This wrapping or casing is left with a projecting or tail part at $e'$. This tail is adapted to be passed through and bent or secured at the slit to hold the diamond in position during casting. The tail is advantageously made flat and split, so that it can be bent apart on the plan of the well-known paper fastener or clip. By having the slit and the tail flat the diamond is prevented from twisting, swiveling, or moving during the operation or while such diamond is held by the tail passed through the slit. The base can have one slit placed in any desired location or a series or several slits, as called for. Consequently this method can be utilized for the manufacture of various tools, drills, saws, or other cutting or operating tools for drilling, boring, or other work.

On the base $c$ is shown a foot-piece $b$ for the mold or form $a$. When the diamond has been secured or clipped to the base and the foot-piece and mold placed in position, molten steel or other metal is poured into the mold. The thin metal wrapping $e$ protects the stone or material $d$ against immediate contact with the hot inflowing metal, but such wrapping melts into or alloys with the molten metal. The stone is thus bound or firmly seated or embedded in the steel or shank $f$, so that it will not work loose or be lost when exposed to strain or when the tool is at work. The stone can be cast into the spindle or metal either centrally or otherwise. A centrally or axially set stone is shown in Fig. 3. In the mold used for eccentrically positioning the stone, Fig. 4, the mold $a$ has an offset either about the foot-piece or at that point or line along which the stone lies, and the projecting part of the resulting casting being then filed or cut away the stone will be left projecting somewhat laterally or eccentrically to form a working portion for cutting or grinding on the rotation of the holder or spindle $f$, Fig. 5.

In place of a spindle or circular holder a flat plate or saw-blade can be formed, as indicated at $f'$ in Fig. 11.

A like offset, as mentioned, can be provided between the mold and the foot of Figs. 9 and 10 and the thick or projecting part of the casting filed away or removed more or less to expose a part of the diamond or rows of diamonds.

An annular or circular drill or tool $f''$ can be formed, as shown in Fig. 8.

The base $c$ in addition to foot $b$ and mold $a$ has a core $a'$. The annular space between the mold parts $a$ and $a'$ being filled with molten metal and the diamonds or stones being embedded an annular drill is formed. Such annular drills are serviceable in mining and other operations.

The mold $a$ can be one piece or in sections. The sectional mold is desired in some cases as enabling easy removal of the complete casting; but a one-piece mold has been found serviceable.

Air-channels $h$ can be formed at suitable places, such as at the bottom edge or face of the mold, to allow escape of air or prevent bubbles forming in the casting. A set of cuts or roughenings by a file form air-vents; but such vents can be so shallow or thin as not to allow escape of molten metal from the mold, but allow escape of air, as indicated by arrows.

The foot $b$, Fig. 10, of the oblong or saw-forming mold is shown in sections or two pieces, and holding parts or dowels $g$ can be used to hold parts in position or in proper relation during casting, while leaving parts of the mold free to be separated when not in use.

The mold $a$ in Fig. 9 is indicated as split or in two sections, as also foot part $b$; but a one-piece mold and foot, as shown in Fig. 1, has been successfully used to form a practically operative tool. A split or sectional mold is readily separable or removable from the complete casting or tool.

Such a form on the plan of Fig. 6 can be used, for example, to cast not only circular tools, but half or quarter circle or other proportion with one or more stones.

The spindle $f$ can be cast in cylindrical, oval, or polygonal or other form with one or more stones.

What I claim as new, and desire to secure by Letters Patent, is—

1. A base having a slit or flat opening or perforation and a mantle or wrapping having a flat tail adapted to be passed through and bent at the slit to hold a diamond in position during casting.

2. A base having one or more slits or flat perforations, combined with a mold adapted to be set on the base and a diamond-holding casing or wrapping having a flat tail adapted to be secured through the slit.

3. The combination with a slitted base or plate, a diamond incased in a metal covering or mantle having a flat tail secured in or through the slit, and a form adapted to sit on the base about the diamond for a casting to be made therein engaging the diamond.

4. The combination with a slitted base or plate, a diamond incased in a metal covering or mantle having a flat tail secured in or through the slit, and a form adapted to sit on the base in eccentric or other suitable position for a casting to be made for engaging the diamond.

5. The combination with a slitted base or plate, a diamond incased in a metal covering or mantle having a flat tail secured in or through the slit, and a form adapted to sit on the base about the diamond for a casting to be made therein engaging the diamond, said form being adapted to sit on the base in eccentric and other desired positions.

6. A base having a slit or opening and a foot, a wrapping secured to the base, and a sectional form or mold adapted to sit on the foot to receive a casting, said base, foot and mold having dowel or engaging portions to hold the parts in position.

7. A base having a slit or flat opening or perforation and a mantle or wrapping having a flat tail adapted to be passed through and bent at the slit to hold a diamond in position during casting, combined with a mold, said device having air channels or vents.

In testimony whereof I have hereunto set my hand in the presence of two subscribing witnesses.

FRIEDRICH KRAUSE.

Witnesses:
W. C. HAUFF,
CHAS. E. POENSGEN.